(12) United States Patent
Ueda et al.

(10) Patent No.: US 7,269,889 B2
(45) Date of Patent: Sep. 18, 2007

(54) METHOD OF MANUFACTURING A MAGNETIC HEAD

(75) Inventors: Kunihiro Ueda, Tokyo (JP); Kentaro Nagai, Tokyo (JP); Hiroki Nakazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 863 days.

(21) Appl. No.: 10/237,744

(22) Filed: Sep. 10, 2002

(65) Prior Publication Data

US 2003/0072105 A1    Apr. 17, 2003

(30) Foreign Application Priority Data

Sep. 11, 2001  (JP) .............................. 2001-274760

(51) Int. Cl.
  G11B 5/127  (2006.01)
  H04R 31/00  (2006.01)

(52) U.S. Cl. ................................ 29/603.14; 29/603.12; 29/603.15; 29/603.16; 29/603.18; 216/22; 216/39; 216/41; 360/122; 360/126; 360/317; 427/127; 427/128

(58) Field of Classification Search ............. 29/603.07, 29/603.12, 603.13–603.16, 603.18, 603.2; 216/22, 39, 41, 48, 65; 360/121, 122, 126, 360/317; 427/127, 128
See application file for complete search history.

(56) References Cited

U.S. PATENT DOCUMENTS 5,175,658 A    12/1992  Chang et al.
5,617,273 A *  4/1997   Carr et al. ................. 360/234.7
5,677,051 A * 10/1997   Ueda et al. ................. 428/336
6,198,600 B1 * 3/2001   Kitao et al. ................. 360/235.2
6,558,563 B2 * 5/2003   Kashiwaya et al. ........... 216/41

FOREIGN PATENT DOCUMENTS

| EP | 0 421 591 A2 | 4/1991 |
|---|---|---|
| JP | 61-106494 | 5/1986 |
| JP | 01-128216 | 5/1989 |
| JP | 02-103714 | 4/1990 |
| JP | 03-120610 | 5/1991 |
| JP | 04-276367 | 10/1992 |
| JP | 06-012615 | 1/1994 |
| JP | 06-150599 | 5/1994 |

(Continued)

OTHER PUBLICATIONS

"Clear stains and their behavior in helical scan tape systems"; Nagai, N.; Kamatani, Y.; Kondo, M.; Onodera, S.; Ozue, T.; Magnetics, IEEE Transactions on vol. 36, Issue 5, Part 1; Sep. 2000; pp. 2699-2701.*

*Primary Examiner*—Paul D. Kim
(74) *Attorney, Agent, or Firm*—Oblon, Spivak, McClelland, Maier & Neustadt, P.C.

(57) ABSTRACT

As a protective film of an element and a slider in a magnetic head, a film is provided which is excellent in adhesiveness to a film forming surface and which shows sufficient corrosion-resistance property with a thinner thickness. To provided this film, according to the present invention, a DLC film as a protective film is formed onto an element portion end surface and a surface of a slider of a magnetic head core. A film deposition step is conducted plural times to obtain the DLC film with a predetermined thickness when the DLC film is formed using an electric discharge.

3 Claims, 4 Drawing Sheets

| FOREIGN PATENT DOCUMENTS | | | |
|---|---|---|---|
| JP | 08045017 A * | 2/1996 | |
| JP | 08-171708 | 7/1996 | |
| JP | 9-63027 | 3/1997 | |
| JP | 11-353615 | 12/1999 | |
| JP | 2000-222707 | 8/2000 | |

\* cited by examiner

METHOD OF MANUFACTURING A MAGNETIC HEAD

BACKGROUND OF THE INVENTION

1. Field of the Invention

The present invention relates to a magnetic head used in a hard disk device (hereinafter referred to as HDD) and a method of manufacturing the same. More specifically, the present invention relates to a magnetic head applicable to a magnetic recording medium having a high recording density, which has a diamond like carbon film or an amorphous like hydrogenated carbon film (hereinafter referred to as a DLC film) as a protective film, and a method of manufacturing the magnetic head for forming the DLC film.

2. Related Background Art

An HDD is one of external storage devices used in a relatively small computer system. As to the HDD, raising of recording density is being progressed in response to the reduction in size and the request for enlarging the storage capacity. As one of structural components of the HDD, there is given a magnetic head for actually performing write and read of information to a magnetic recording medium. Examples of the magnetic head include a so-called thin film head, a so-called AMR head or GMR head using a magneto-resistance effect, and a TMR head using a tunnel phenomenon. Raising of recording density is aimed at by selecting any of various magnetic heads described above.

A core portion in the magnetic head described above is constituted by an element portion for actually writing information or reading information from to a magnetic recording medium and a portion called slider (substrate portion) formed with the element portion on its end portion. Such a structure is adopted in which a predetermined surface of the slider and the element portion (end surface) are integrally floated and opposed with respect to the magnetic recording medium with a predetermined distance in the case where write of information or the like is conducted.

In the element portion, various metals such as a soft magnetism film constituting an element are exposed, and there is a fear that rust and the like develop in these metals, which leads to deterioration of the magnetic property and the like. Therefore, a protective film onto the surface of the element portion is formed, and various films having corrosion-resistance property are proposed for the protective film. Further, since the slider is floated from the recording medium by a wind pressure that is generated due to rotation of the magnetic recording medium, or the like to thereby maintain the above-described predetermined distance, low frictional performance is also required for the slider predetermined surface in order that the slider slides with ease and with low load in the initial stage of rotation.

In order to response to the above requests, the following is conducted in which the protective film is formed of a material having both the above-described corrosion-resistance property and low frictional performance on the surface of the substrate opposite to the magnetic recording medium and on an opposing part of the element portion opposite to the magnetic recording medium (hereinafter both are referred to as a film forming surface). DLC (diamond like carbon) is used as the material for the protective film in recent years.

As an example in which a DLC film is formed on the above-described film forming surface, there is given the magnetic head disclosed in Japanese Patent Application Laid-open No 9-63027. In that document, there is described that the DLC film is an amorphous film obtained by using plasma discharge, and so-called CSS (contact start stop) property in an HDD device is greatly improved by the formation of the DLC film. Further, there is described that, in order to obtain satisfactory wear or abrasion resistance property or satisfactory resistance in a CSS test, the DLC film needs to have a thickness of 20 Å or more and that, in order to improve adhesiveness between the DLC film and the film forming surface, it is effective that a silicon layer or a silicon carbide layer is formed as a base film.

A so-called flotation distance between the above-described film forming surface and the magnetic recording medium is desired to be smaller along with raising of recording density in recent years. From this point of view, in the protective film, it is necessary that the thickness is made thinner and sufficient corrosion-resistance property and low friction performance are maintained. According to Japanese Patent Application Laid-open No. 9-63027 described above, in order to obtain sufficient resistance (low frictional property) with the use of the DLC film, it is sufficient that the thickness is set to 20 Å or more, but in order to make the floatation distance small as well as maintain both the corrosion-resistance property and low frictional property, namely, in order to thin the thickness of the protective film, a method of forming a protective film or DLC film needs to be further developed.

Further, on the film forming surface, the substrate portion made of ceramic which is an insulator, and an insulating layer, a conductive layer, and a magnetic layer which exist in the element portion are exposed. Therefore, in case of using a film deposition method wherein species used for film deposition is generated by an electric discharge, for example, there is a fear that the potential difference develops in the film forming surface, and the film forming speed in the initial stage of the film deposition largely differs depending on a material of the film forming surface. In this case, it is considered that large variation in film thickness is caused, which means that there is caused the state in which, for example, the thickness of the DLC film locally becomes thin, or the film is not formed locally, and the local portion becomes a pin hole or the like, which leads to deterioration of corrosion-resistance property.

Further, in a general process of manufacturing a magnetic head, polishing processing is conducted to the film forming surface before undergoing the formation of the protective film, and few irregularities are formed on the surface. The film deposition speed generally differs between on a concave portion and a convex portion although this depends on where the irregularities exist among the insulating layer, the conductive layer, and the magnetic layer. Therefore, in the case where the film deposition speed is slow particularly in the concave portion, there is a fear that the portion remains as the pin hole, as a result of which the corrosion-resistance property is greatly deteriorated.

In terms of the corrosion-resistance property, there has been adopted the measure in the prior art in which, for example, the thickness of the DLC film is made thick, thereby obtaining the state in which no pin hole outwardly exists on the surface of the DLC film in order to make the influence of the pin hole or the like small as much as possible. However, in actuality, it has been difficult that the corrosion-resistance property is remarkably improved by means of the above measure, and also it has been difficult that the above-described demand for thinning the protective film is satisfied since the thickness of the DLC film has to be made larger than the thickness required.

SUMMARY OF THE INVENTION

The present invention has been made in view of the above, and an object of the present invention is to provide a method of forming a DLC film which exhibits sufficient corrosion-resistance property with a thinner thickness and which ensures satisfactory adhesiveness to a film forming surface and further to provide a method of forming a DLC film that exhibits sufficient corrosion-resistance property with a thinner thickness as to a DLC film that is obtained according to the prior art in the case where reduction in thickness of a film as a single component is aimed at as well. Further, another object of the present invention is to provide a magnetic head in which the DLC film is used as a protective film.

In order to solve the above object, there is provided a method of manufacturing a magnetic head, including the steps of: laminating an insulating layer, a conductive layer, and a magnetic layer on one surface of a substrate and processing each of the layers to have a predetermined shape, thereby forming an element portion having at least one of a recording element and a reproducing element; and forming a protective film to at least a part of a predetermined surface in the substrate which faces a magnetic recording medium and to a portion in the element portion which faces the magnetic recording medium, in which, in the step of forming the protective film having a predetermined thickness, the protective film is formed from a plurality of layers.

Incidentally, it is characterized in that the step of forming the protective film in the plurality of layers comprises repeating plural times a step of forming a single layer, which includes: generating plasma using a gas containing an organic compound; forming a first layer with species for film deposition generated from the plasma; and then, disappearing the plasma. Further, it is preferable that the step of forming the protective film further includes a step of forming a silicon film or a silicon oxide film to at least the part of the predetermined surface in the substrate which faces the magnetic recording medium and to the portion in the element portion which faces the magnetic recording medium prior to the step of forming the protective film with a predetermined thickness.

In order to solve the above object, there is provided a magnetic head having at least one of a recording element and a reproducing element formed by laminating an insulating layer, a conductive layer, and a magnetic layer on one surface of a substrate and processing each of the layers to have a predetermined shape, characterized in that: the element has a protective film on its specific surface which faces a magnetic recording medium that is an object on which information is to be recorded or reproduced; and the protective film includes a plurality of layers formed from the same structural element.

Incidentally, it is preferable that the film formed from the same structural element is a film formed from carbon as a main structural element. Alternatively, in the film that consists of the plurality of layers formed from the same structural element, it is preferable that the film thickness ratio of the layer closest to the specific surface in the film that consists of the plurality of layers to the total of the plurality of layers is 25 to 65%. Moreover, it is preferable that the protective film has a base film at a portion closer to the specific surface than the plurality of layers formed from the same structural element.

Note that the generation of plasma is preferably performed by using a so-called ECR condition. Alternatively, the generation of plasma is preferably performed by using a parallel flat plate type plasma generation apparatus constituted by an anode electrode having substantially a plate shape and a cathode electrode having substantially a plate shape which is arranged parallel thereto with a predetermined distance therebetween and using a high frequency of 1 kHz to 1 MHz. Further, the plurality of layers formed from the same structural element are comprised of two or more layers, and even with the total thickness of 20 Å, sufficient corrosion-resistance property is obtained.

DESCRIPTION OF THE PREFERRED EMBODIMENTS

Figure 1:
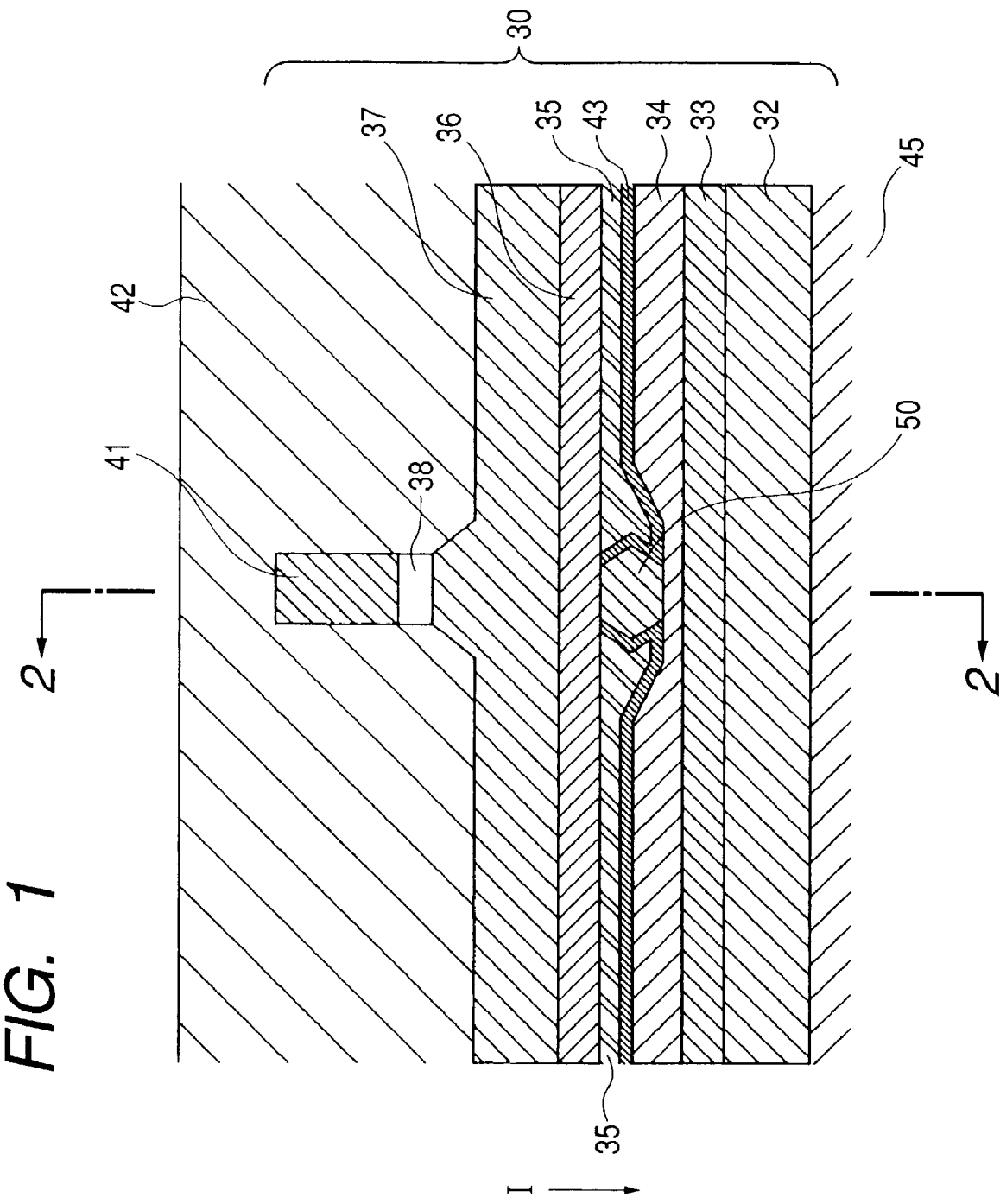
FIG. 1 is a schematic diagram showing a structure of a magnetic head used in implementing the present invention, which is observed when an end surface of an element portion is seen from the side of a magnetic recording medium before formation of a DLC film.

As to a method of forming a DLC film according to the present invention, the action will be described below. The DLC film as a protective film of a magnetic head is formed in many cases by a plasma CVD method, an arc discharge method, or the like which uses plasma generated by an electric discharge phenomenon. Before the formation of the DLC film, polishing processing is performed to an end surface of an element portion and to a slider predetermined surface on which the DLC film is formed so as to make these surfaces flat with respective dimensions of the element portion as predetermined values. However, in actuality, an irregularity portion for each structural component is generated due to the difference in a polishing speed in a material constituting each component. Further, in the same portion, microscopic irregularities are formed by polishing.

In a film deposition method using an electric discharge phenomenon, for example, in the case where a film is formed to a substrate having conductivity, an electric discharge is easy to concentrate at the portion that becomes convex to an electric discharge space while an electric discharge does not approach the portion that becomes concave. Therefore, in the case where the film deposition is continued on the substrate in this state, a phenomenon occurs in which the film deposition to the convex portion is conducted prior to the concave portion, and there arises the situation in which the thickness of the concave portion becomes thin or a pin hole develops with the concave portion as a cardinal point or other situations. Further, in the case where ions make contributions as species for film deposition, there occurs a phenomenon in which the film deposition speed is raised more on a conductor which ions easily enter than on an insulator.

In view of this, according to the present invention, film deposition is performed plural times in order to obtain a DLC film with a target thickness. Specifically, in the first film deposition, a DLC film is formed with a thickness of one several of the target thickness. As a result, among the portions having conductivity, the formation of the DLC film to the convex portion is conducted first, and the concave portion is maintained in a state in which a very thin DLC film is formed or a film is not formed in the concave portion at all. The DLC film used here has a high resistance value close to that of an insulator. Thus, the portion where the DLC film is very thin or the concave portion shows conductivity while the portion where the DLC film is formed with a thickness at a certain degree substantially functions as an insulator with respect to an electric discharge.

Therefore, the portion to which the film is formed exhibits a substantially similar function to that of the surface portion of ceramic or the like which has been an insulator since the beginning of film deposition. Further, in the first film deposition, it is considered that the film deposition speed of the surface portion of the insulator such as ceramic is extremely slower than that of the convex portion of the conductor. Note that the stop of an electric discharge and the exhaustion of a gas are preferably performed as occasion demands after the completion of the first film deposition. This procedure is preferably performed after the formation of each layer. If the second film deposition is performed in this state, the DLC film is first formed to the portion where the conductive portion is exposed and the portion that has a function close to that of a conductor with respect to an electric discharge because of thinness of the thickness of the DLC film. Since other portions except the above portions function as an insulator having a substantially uniform resistance value with respect to an electric discharge, film deposition is performed at a film deposition speed that is extremely slower than that of the portion where the film is formed first but is uniform in the other portions.

In this state, even in the case where the film deposition is continued until a predetermined thickness is obtained, the pin hole or the like that is a cardinal point at which corrosion of metal or the like starts is greatly reduced when seen from the surface of the DLC film in comparison with the case where the DLC film with a predetermined thickness is formed at a time as in the prior art. However, when the film deposition is stopped and resumed, in addition to the effect that further reduction of the pin hole or the like is attained, the DLC film with a predetermined thickness can be formed with uniform property on conductivity with respect to the entire film forming surface. Therefore, there can be expected the effect that the distribution and thickness uniformity of the DLC film is improved.

Through the above-described steps, it becomes possible that the entire film forming surface is uniformly covered with the DLC film in the relatively early stage of the DLC film formation. That is, the film deposition of the DLC film with a very thin thickness is performed plural times, whereby the DLC film can be formed effectively and uniformly to the metal portion that is a conductor existing in the element portion end surface. Further, the DLC film can be formed while the portion constituted by the metal portion and the portion made of ceramic, such as the slider can be made to substantially and uniformly function as an insulator with respect to an electric discharge. Thus, the DLC film with a substantially uniform thickness can be obtained irrespective of the electrical property of the above respective portions.

Note that as a DLC film forming apparatus used in film deposition, it is preferable to use a so-called ECR or parallel flat plate type plasma CVD apparatus with which the above-described plasma processing can be easily performed.

Here, the so-called parallel flat plate type plasma CVD apparatus is constituted by a substantially plate-like anode electrode and a substantially plate-like cathode electrode that is arranged parallel thereto with a predetermined distance therebetween. A direct-current voltage or high frequency is applied to at least one of both the electrodes, thereby generating an electric discharge between both the electrodes. The substrate on which the DLC film is to be formed is generally arranged to the anode electrode side. However, the same effect can be obtained in the case where the substrate is arranged on the cathode electrode side in the present invention.

A high frequency is used in an electric discharge, namely, plasma generation. Based on the knowledge that the inventor of the present invention has obtained so far, the DLC film exhibiting satisfactory frictional performance can be obtained in the case where the frequency to be used is 1 kHz to 1 MHz. In the case of a higher frequency of 1 MHz to 40 MHz, the film quality is improved by applying a bias voltage to the side on which the substrate is arranged, thereby being capable of obtaining satisfactory frictional performance.

Further, as highly active plasma, there is known plasma which is generated by applying a high frequency of 2.45 GHz to electrons that perform cyclotron motion in a magnetic field and periodically accelerating the electrons, that is, plasma which is generated under a so-called ECR condition. In the ECR-CVD method using the plasma as well, it is possible to obtain the DLC film having the same quality as in the case of the plasma CVD method using the above-described parallel flat plate type apparatus. In the embodiment described below, ECR-CVD is selected among the above CVD methods, and the DLC film is formed using ECR-CVD.

It is described above that there is an arc discharge method as the method of forming a DLC film. Although the arc discharge method is not used in the embodiment described below, it is apparent that the same effect as in the case of the plasma CVD method can be obtained also in the case of the arc discharge method in the implementation of the present invention. Hereinafter, brief description is made of the arc discharge method. In the arc discharge method, arc discharge that travels to a graphite target is generated at the tip end of a nozzle while an argon gas is sprayed from the nozzle. Carbon atoms on the target are ionized to be evaporated due to energy of the arc discharge, and the resultant is adhered onto the substrate, thereby completing film deposition.

Further, in another arc discharge method, a striker is used at the end portion of a graphite rod to generate arc, carbon is vaporized directly, and ions or clusters in the volatile species are deflected by a magnetic field or the like to be adhered to the substrate, thereby completing film deposition. With this method, since carbon ions having high energy can be easily generated, a hard film is easily obtained. Further, since the species for film deposition are only carbon ions, there can be obtained a uniform film not containing hydrogen and the like even with a very thin thickness.

According to the arc discharge method, it is possible to easily obtain a film appropriate as a protective film, and it is considered that a remarkable effect is obtained even with a thinner thickness by implementing the present invention. However, it is considered that to obtain a uniform film deposition speed in a wide film deposition region is more difficult in the arc discharge method than in the plasma CVD method with the parallel flat plate type plasma CVD apparatus, or the like. Thus, from the viewpoint of productivity, only one example is implemented in the embodiment described below.

Note that, it is known that a thin film having optical transparency has a constant interrelation between the film quality and the refractive index. Further, it has been confirmed that the quality of the DLC film obtained in accordance with the forming method of the present invention has satisfactory frictional property assuming that the refractive index of the DLC film formed with a thickness of 30 to 60 nm on a silicon wafer is 2 to 2.35. In the case of a refractive index of 2 or less, frictional property is deteriorated, and it is preferable to obtain a high refractive index when attention is paid only to the frictional property. However, the frictional property does not vary greatly with a refractive index of more than 2.35. It is effective that an applied power of a high frequency is increased in order to increase a refractive index, but in the case of a refractive index of more than 2.35, there cannot be obtained frictional property that corresponds to the necessary increase of the applied power of the high frequency. Taking the above into consideration, it is desirable to adopt the film deposition condition which ensures a refractive index of 2.2 to 2.3 with which the same film property is obtained as in the case of a refractive index of 2.2 that shows preferable film property.

Further, as pre-processing for the above-described substrate, there are given various processing methods such as wiping an oil component with the use of alcohol or the like and ultrasonic cleaning. However, the above processing is not necessarily required, and appropriate processing may be conducted in accordance with the state of the film forming surface. Further, examples of a usable hydrocarbon gas as a material in the plasma CVD method include methane, ethane, propane, butane, ethylene, acetylene, and propylene or the like. Further, liquid hydrocarbon such as benzene or toluene can be used as long as gasification thereof is performed and reliquefaction thereof in the internal of the apparatus or the like are prevented.

PRACTICAL EXAMPLES

A DLC film is actually formed on a film forming surface of a magnetic head under various conditions by using a DLC film forming method, and tests on reliability and corrosion resistance were made. The results obtained by implementing the present invention will hereinafter be described in detail. Note that the following description will be made of a method of manufacturing a magnetic head including a method of forming a DLC film, such as a method of forming an element. As to elements, a so-called TMR element is used for a reproducing portion and a so-called induction electomagnetic conversion element is used for a recording portion.

Figure 2:
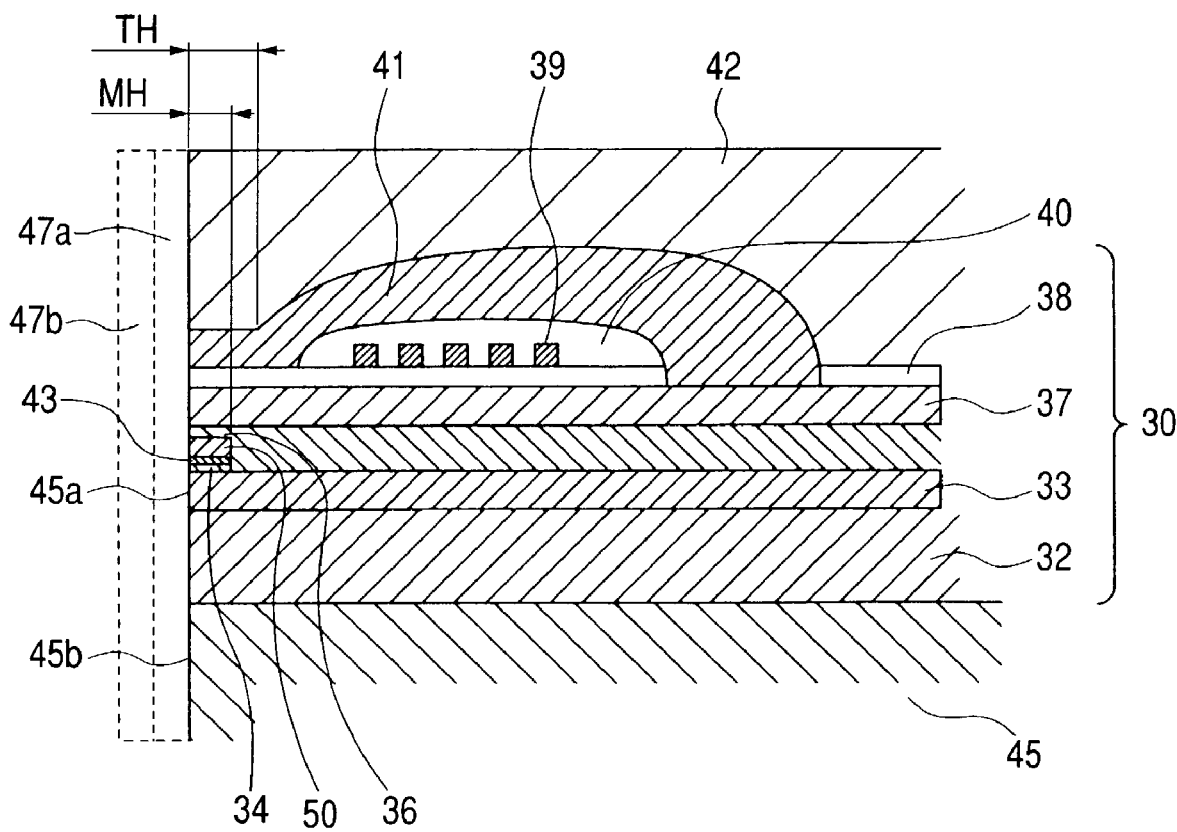
FIG. 2 is a schematic diagram of a structure observed from a track width direction (left side in the figure) of the magnetic recording medium in the case where the element portion and the like are cut along a cutting plane line 2-2 in FIG. 1.
Figure 3:
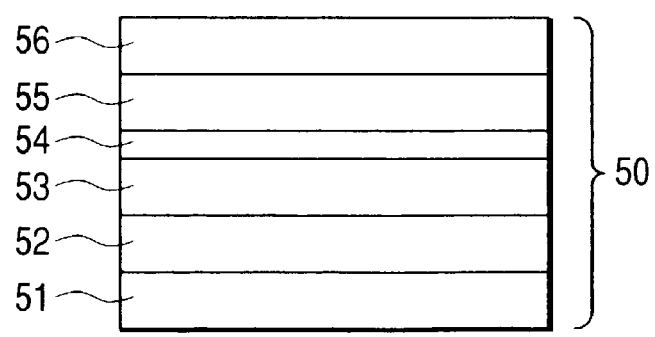
FIG. 3 is an enlarged view of an MR element portion in FIG. 1.

FIG. 1 relates to a magnetic head used in the implementation of the present invention, and shows a schematic structure that is observed when an end surface of an element portion before undergoing formation of a DLC film is seen from the side of a magnetic recording medium. Further, FIG. 2 shows a schematic structure observed from a track width direction (left side in the figure) of the magnetic recording medium in the case where the element portion and the like are cut along a cutting plane line 2-2 in FIG. 1. Moreover, FIG. 3 is an enlarged view of an MR element portion in FIG. 1. The method of forming a magnetic head according to the present invention is described below with reference to these drawings.

In the method of forming a magnetic head, a plurality of element portions 30 are simultaneously formed on a wafer-like substrate 45 made of ceramic such as AlTiC by using a thin film forming technique, a processing technique, and the like which are used in, for example, forming a semiconductor. Here the substrate corresponds to a slider in the case where the element portions 30 are individually separated to form magnetic head cores. Note that a thin film making an element portion formed in this embodiment is formed by a thin film forming method such as a sputtering method.

In the actual formation of the element, an alumina film with a thickness of about 5 μm as a base layer 32 is formed on the substrate 45, and a first shield layer 33 formed of a permalloy film with a thickness of 2 μm is formed thereon which functions as a magnetic shield to an MR element 50. Thereafter, a tantalum film or the like with a thickness of 0.05 μm as a first gap layer 34 is formed on the first shield layer 33, and the MR element 50 is formed on the tantalum film.

Specifically, just above the first gap layer 34, a base layer 51 formed of any of tantalum, permalloy, copper and nichrome (NiCr), an antiferromagnetic layer 52 formed of iridium-manganese or the like, a so-called pinned layer 53 formed of cobalt-iron, a barrier layer 54 formed of an alumina oxide film, a so-called free layer 55 formed of cobalt-iron or permalloy, and a cap layer 56 formed of tantalum are successively formed. After the formation of these films, the films are removed except a predetermined portion by photolithography, etching or the like, thereby forming the MR element 50. As to the left portion after the removal, a cobalt-platinum film or the like as a bias layer 35 is formed so as to be adjacent to both end portions of the MR element 50 through an insulating layer 43. The MR element 50 and the bias layer 35 each are structured to have a thickness of 35 nm.

Note that, in the element, a current flows in a direction of a lamination layer of the thin films as indicated by an arrow I in the figure. Therefore, it is necessary to prevent the current from flowing through portions except the element portion, and the insulating layer 43 is formed on both sides of the MR element 50 and on an upper surface of the first gap layer 34.

After the formation of the bias layer 35, a second gap layer 36 formed of a tantalum film with a thickness of 0.05 μm, a second shield layer 37 formed of permalloy with a thickness of 4 μm, and a writing gap layer 38 formed of an alumina film or the like with a thickness of 0.3 μm are successively formed. On the writing gap layer 38, a copper thin film used for a thin film coil 39 is formed, and the copper thin film is processed to have a predetermined coil shape through a processing step such as photolithography or etching.

Subsequently, a leveling layer 40 formed of photoresist or the like is formed on the thin film coil 39 to attain insulation of wires of the coil and levelness of irregularities due to the wires. Thereafter, the leveling layer 40 and the writing gap layer 38 are respectively processed to have predetermined shapes by an etching step or the like. A permalloy film with a thickness of 5 μm as a writing pole 41 is formed on the writing gap layer 38, and is processed to have a predetermined shape with a width of 0.5 μm. After processing, as a protective layer 42, an alumina film is formed such that the total thickness of the element portion is 30 μm.

After the plurality of element portions 30 are formed on the AlTiC substrate 45 through the above steps, the AlTiC substrate 45 is cut into a rod shape for each column of the element portions 30. After cutting, the rod-shape substrate is fixed to a not-shown polishing device, and an element portion end surface 45a and a slider predetermined surface 45b, which are cut surfaces, are simultaneously polished to obtain an MR height MH and a throat height TH which respectively have predetermined values. Note that, with the polishing device, a surface plate made of soft metal is rotated, a suspension containing diamond grains is dropped thereon, and the predetermined surface of the rod-shape substrate is pressed against the surface plate, thereby conducting polishing. Further, in case of necessity, there is formed to the slider predetermined surface 45b after undergoing polishing an irregularity portion not shown with a predetermined shape such as a rail for satisfactorily floating the magnetic head at the time of the rotation of the magnetic recording medium.

At the time of polishing described above, there may be a case where a smear phenomenon occurs in which, for example, the end surface of the metal film is beaten to be thin due to ductility, which leads to the occurrence of short circuit in each of the metal films. In this case, milling or reverse sputtering is performed in order to remove the short circuit portion. Milling in which a voltage of 100 to 500 V is applied as an accelerating voltage using an argon gas and an object portion is removed due to a sputter phenomenon with the accelerated argon ions, and the like are well known, and therefore, detailed description thereof will be omitted.

After polishing and the like, DLC films 47a and 47b (indicated by broken lines in FIG. 2) are formed on the film forming surface including the element portion end surface 45a and the slider predetermined surface 45b. Note that the magnetic head in which the DLC film is formed in two installments is shown in FIG. 2. In the actual method of manufacturing a magnetic head, after the formation of the DLC film, separation of individual elements is conducted, and each of the elements is treated as a magnetic head core. However, in this embodiment, in order to enable simultaneous implementation of a reliability test and the like with respect to the plurality of element portions, various tests are conducted in the state of the rod-shape substrate after undergoing the formation of the DLC film.

Film deposition conditions of the DLC film in this embodiment are shown in Table 1.

9 and 13, a silicon film with a thickness of 20 Å and a silicon film with a thickness of 10 Å are respectively formed as a base film of the DLC film. Note that as to the thickness of the DLC film, the film deposition speed of the DLC film is previously measured under the film deposition conditions with which a refractive index of 2.2 or more is obtained, and the film deposition time is regulated in accordance with the film deposition speed, thereby obtaining the values in the table. Further, in the case where the DLC film is formed in a plurality of installments, after the completion of the formation of the first layer, stop of an electric discharge and vacuum exhaustion of an electric discharge space are conducted, a hydrocarbon gas is introduced into the film forming apparatus, and then, start of an electric discharge and film deposition of the second layer are conducted. Also in the case where the third layer or the subsequent layer is formed, the same step is conducted between the second layer and the third layer, between the third layer and the fourth layer, or the like.

Since the DLC film has a refractive index of 2.2 or more, it is found that the DLC film can obtain sufficient low frictional performance. Then, as to corrosion-resistance property, a reliability test and a corrosion test were conducted. In the reliability test, after the DLC film was kept for seven days in an environment with a temperature of 60° C. and a humidity of 90%, a corrosion state was examined. In actuality, before and after keeping the DLC film in the environment described above, an operation is conducted in which a voltage is applied to each MR element such that a current of 0.1 mA flows therethrough to obtain the voltage value, and the resistance value is obtained from the voltage value. Evaluation was made based on variation of the resistivity.

In the corrosion test, a sample was immersed in a sulfuric acid aqueous solution of 0.1 wt. % one whole day and night, and a ratio of a peak strength of Co/C in the surface of the sample was found by ESCA (X-ray photoelectron spectroscopy). In ESCA, X-rays are irradiated to a substance, and kinetic energy of electrons, which is generated due to the photoelectric effect, is analyzed and measured by using an electric field or magnetic field. The evaluation obtained here is based on a phenomenon in which, although only the peak

TABLE 1

| Embodiment No. | DLC Film Thickness | Number of Times of Film Deposition | First Layer | Second Layer | Third Layer | Fourth Layer | Ratio of First Layer |
|---|---|---|---|---|---|---|---|
| Embodiment 1 | 5(Å) | 2 (times) | 2(Å) | 3 | — | — | 40 (%) |
| Embodiment 2 | 10 | 2 | 4 | 6 | — | — | 40 |
| Embodiment 3 | 20 | 2 | 8 | 12 | — | — | 40 |
| Embodiment 4 | 40 | 2 | 16 | 24 | — | — | 40 |
| Embodiment 5 | 50 | 2 | 20 | 30 | — | — | 40 |
| Embodiment 6 | 30 | 3 | 10 | 10 | 10 | — | 33.3 |
| Embodiment 7 | 40 | 4 | 10 | 10 | 10 | 10 | 25 |
| Comparative Example 1 | 50 | 1 | 50 | — | — | — | 100 |
| Embodiment 8 | 20 | 2 | 8 | 12 | — | — | 40 |
| Embodiment 9 | 20 | 2 | (20) | 8 | 12 | — | 40 |
| Embodiment 10 | 20 | 2 | 12 | 8 | — | — | 60 |
| Embodiment 11 | 20 | 2 | 4 | 16 | — | — | 20 |
| Embodiment 12 | 20 | 2 | 2 | 18 | — | — | 10 |
| Embodiment 13 | 20 | 2 | (10) | 8 | 12 | — | 40 |

Here, the DLC film is formed by an arc discharge method in Embodiment 8 while the DLC film is formed by an ECR-CVD method in other embodiments. In Embodiments of C (carbon) is originally observed from the vicinity of the surface of the DLC film, the peak of Co (cobalt: used for a magnetic film of an element) is observed in the case where a pin hole or the like exists in the DLC film, which leads to the occurrence of the corrosion of the element.

The evaluation results are shown in Table 2.

TABLE 2

| Embodiment No. | Reliability Test (Variation of Resistivity) | Corrosion Test (Ratio of Peak Strength) |
|---|---|---|
| Embodiment 1 | 10% | 0 to 10% |
| Embodiment 2 | 6% | Not found |
| Embodiment 3 | Below 5% | Not found |
| Embodiment 3 | Below 5% | Not found |
| Embodiment 4 | Below 5% | Not found |
| Embodiment 5 | Below 5% | Not found |
| Embodiment 6 | Below 5% | Not found |
| Embodiment 7 | Below 5% | Not found |
| Comparative Example 1 | 35% | 10% or above |
| Embodiment 8 | Below 5% | Not found |
| Embodiment 9 | Below 5% | Not found |
| Embodiment 10 | 15% | 0 to 10% |
| Embodiment 11 | 6% | Not found |
| Embodiment 12 | 10% | 0 to 10% |
| Embodiment 13 | Below 5% | Not found |

The evaluation results are considered below. From the comparison between Comparative Example 1 and Embodiment 1, as a result of the film deposition of the DLC film in two layers, even with the total thickness of 5 Å, more excellent corrosion-resistance property is obtained than those in the case where the DLC film is formed with a thickness of 50 Å in a single layer. Therefore, according to the implementation of the present invention, the thickness of the DLC film as the protective film can be remarkably reduced more than that in the prior art.

Embodiment 8 provides the result of the formation of the DLC film with an arc discharge method. From the comparison between Embodiment 8 and Embodiment 3, corrosion-resistance property of the DLC film is improved according to the implementation of the present invention irrespective of an electric discharge form (method of forming plasma). Therefore, taking into consideration pre-processing for the film forming surface, the size of a region for forming a film that requires a uniform thickness, the film deposition speed in consideration of productivity, and the like, various electric discharge forms can be used in implementing the present invention.

Figure 4:
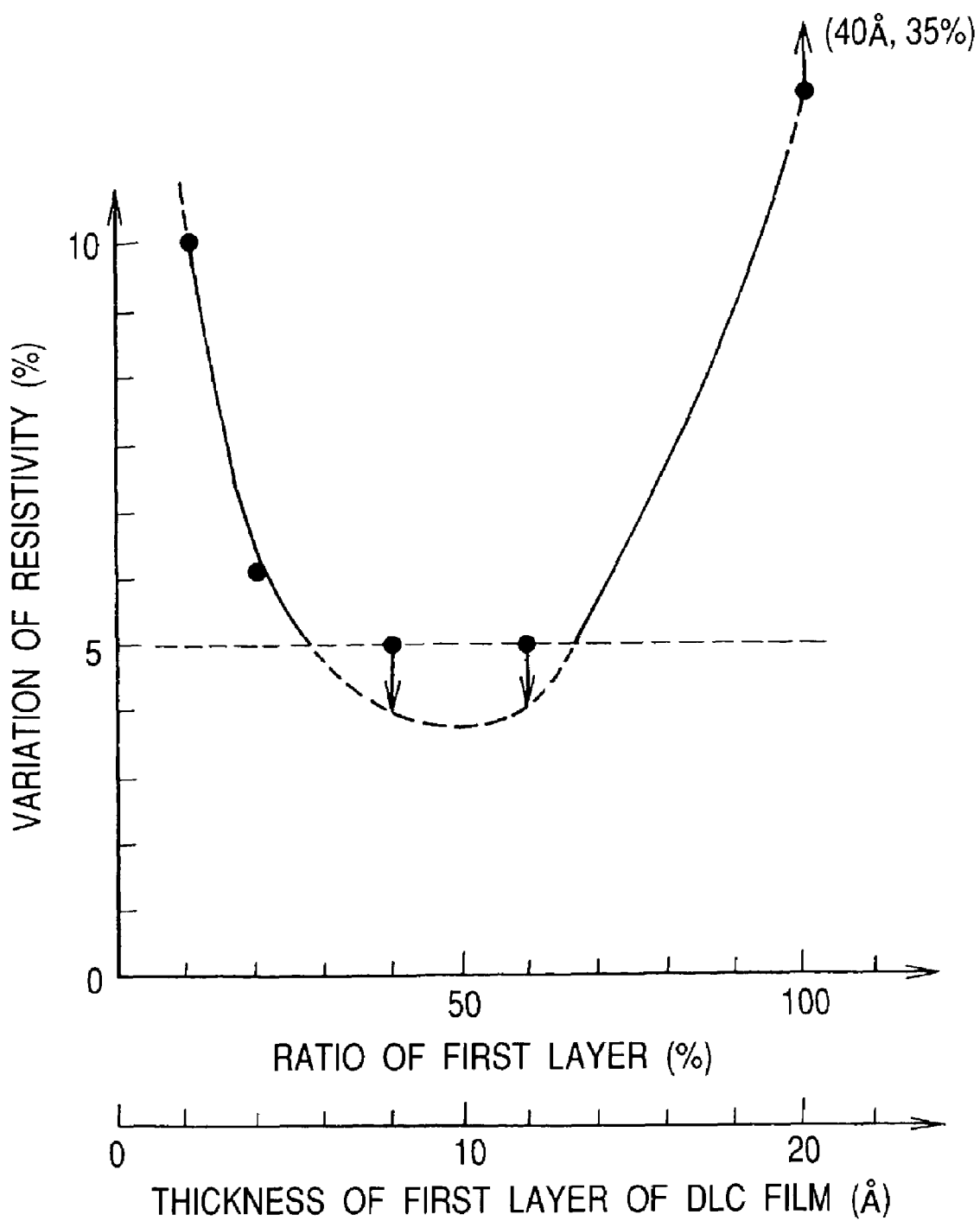
FIG. 4 is a graph of evaluation results in an embodiment.

According to Embodiments 1 to 5, when the thickness of the first layer of the DLC film is set to occupy 40% with respect to the total thickness of the DLC film, satisfactory corrosion-resistance property is obtained as long as the DLC film has a thickness of 20 Å. Further, from FIG. 4 in which the results of Embodiments 3 and 10 to 12 are collected, in the case where the total thickness is 20 Å, satisfactory corrosion-resistance property is obtained by setting the thickness of the first layer to 5 to 13 Å. Further, in terms of the ratio of the thickness of the first layer to the total thickness, satisfactory corrosion-resistance property is obtained by setting the ratio of the first layer to 25 to 65%.

Further, from the comparison between Embodiments 9 and 13 in which a silicon film is used as a base film and Embodiment 3 (in the case where the silicon film thickness is 0 Å), sufficient corrosion-resistance property is obtained with the DLC film having a thickness of 20 Å irrespective of the existence of the base film. Therefore, it is considered that the same result can be obtained also in the case where a silicon oxide film or the like is used as the base film. That is, in the case where the DLC film according to the present invention is used and at the same time in the case where adhesiveness of the DLC film needs to be improved, it is sufficient to form the base layer with the minimum thickness that is necessary and sufficient from the viewpoint of the improvement of adhesiveness.

In other words, even in the case where the improvement of adhesiveness is aimed at by using the base film, it is possible to form the DLC film that is very thin and excellent in adhesiveness and corrosion-resistance property compared with the DLC film in the prior art or the like. That is, according to the implementation of the present invention, it is possible to provide a magnetic head which has a very thin DLC film as a protective film and which can narrow the distance between an element portion end surface and a magnetic recording medium compared with the prior art.

Figure 5:
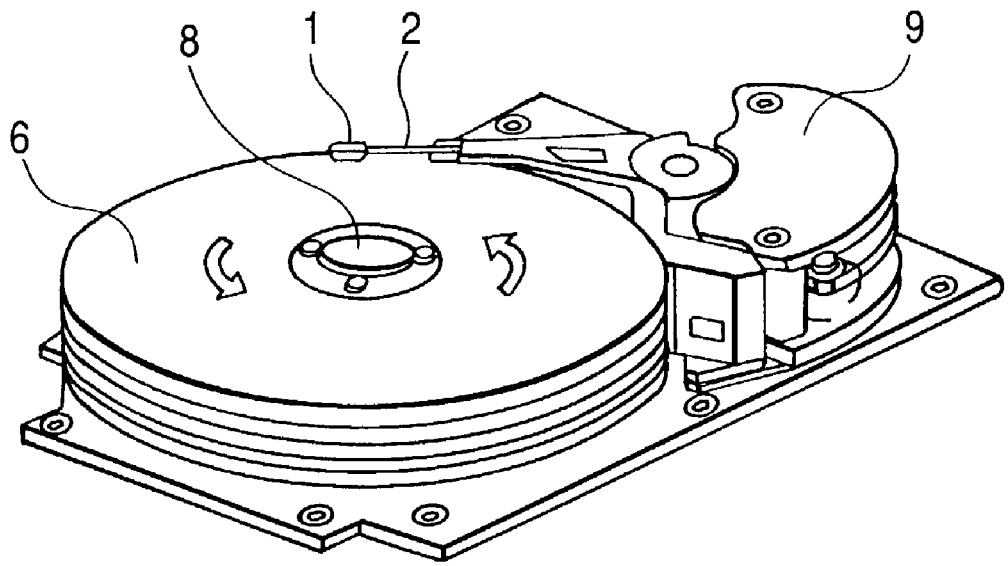
FIG. 5 is a diagram showing a schematic structure of a hard disk device (HDD) mounted with the magnetic head according to the present invention.

The magnetic head according to the present invention has the DLC film formed in a plurality of installments as a protective film with respect to the element end surface and the slider predetermined surface by being subjected to the above-described steps. Hereinafter, an HDD using the magnetic head and a head-gimbal assembly will be described. FIG. 5 shows a schematic structure of the HDD mounted with the magnetic head according to the present invention. The HDD is constituted by a magnetic disk 6 that is a magnetic recording medium, a spindle motor 8 that rotationally drives the magnetic disk 6, a magnetic head 1 supported above the magnetic disk 6 by a gimbal 2, and a driving device 9 which supports the gimbal 2 and rotates the magnetic head 1 parallel to a recording surface of the magnetic disk 6.

Figure 6:
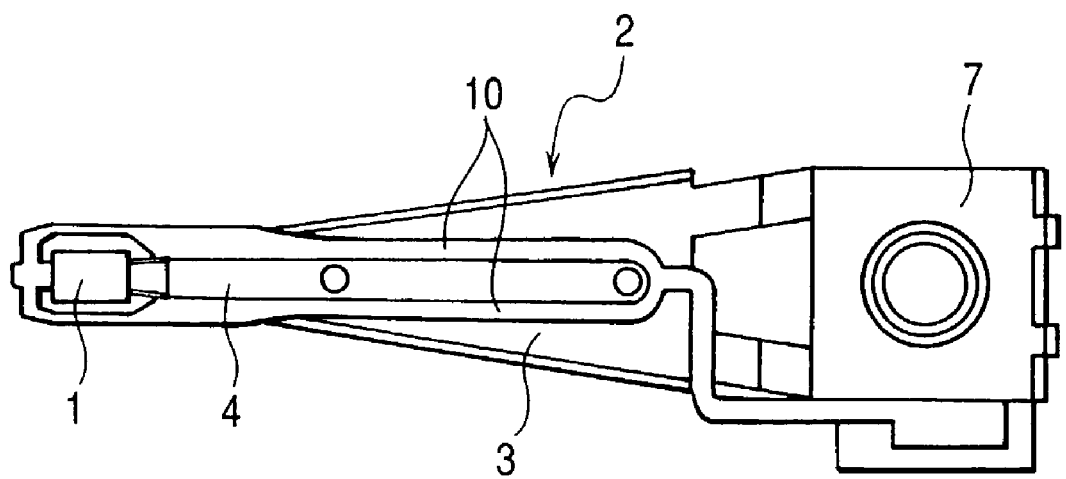
FIG. 6 is a schematic diagram of a state in which a head-gimbal assembly mounted with the magnetic head according to the present invention is seen from the top.

In the HDD, the magnetic head 1 is mounted after being assembled as the head-gimbal assembly. FIG. 6 shows a state in which the head-gimbal assembly in which the magnetic head 1 according to the present invention is attached to the gimbal 2 is seen from the top. The gimbal 2 is constituted by a flexure 4 that imparts an appropriate degree of freedom to the magnetic head 1, a load beam 3 which is made of an elastic metal thin plate or the like and to which the flexure 4 is bonded, and a base plate 7 which is fixed to a proximal end of the load beam, which is one end portion of the gimbal 2, and which is supported by the driving device 9. The magnetic head 1 is supported by the other end of the gimbal 2, and the element portion is electrically connected to a conductor pattern 10.

Note that only the case where the DLC film is formed as the protective film of the magnetic head is described in this embodiment. However, in accordance with a method using an electric discharge according to the present invention, the same effect is obtained in different films as well. It is possible to form various films such as a silicon film and a silicon oxide film as the protective film or the base film by using a method of forming a protective film according to the present invention. In this case, when a silicon film is formed, silane, disilane or the like which is constituted of silicon and hydrogen may be used as a material gas, and when a silicon oxide film is formed, methanol, ethanol, or the like which is constituted of oxygen and hydrogen may be used.

Note that although the structure of the element portion and the method of forming the element portion are specifically described in detail in this embodiment, the present invention is not limited to the element structure. The present invention can be applied also to magnetic heads having various structures and films, for example, a magnetic head having an AMR element or GMR element and a write-only induction magnetic head.

According to the implementation of the present invention, there is obtained the DLC film which is excellent in adhesiveness to the film forming surface and which shows sufficient corrosion-resistance property with a thinner thickness. Further, in the case where the silicon film or the like is used as the base layer in order to improve the adhesiveness to the film forming surface, the thickness can be made thinner than that of the base layer in the prior art.

What is claimed is:

1. A method of manufacturing a magnetic head, comprising the steps of:

laminating an insulating layer, a conductive layer, and a magnetic layer on one surface of a substrate and processing each of the layers to have a predetermined shape, thereby forming an element portion having at least one of a recording element and a reproducing element; and forming a protective film to at least a part of a predetermined surface in the substrate which faces a magnetic recording medium and to a portion in the element portion which faces the magnetic recording medium, wherein the forming of the protective film comprises forming a plurality of layers comprising a same structural element into a predetermined thickness by repeating plural times a step of forming a single layer, which includes generating plasma using a gas containing an organic compound, forming a first layer with species for film deposition generated from the plasma, and eliminating the plasma after the formation of the first layer.

2. A method according to claim 1, wherein the protective film is a DLC film, and the forming of the protective film further includes forming a silicon film or a silicon oxide film to at least the part of the predetermined surface in the substrate which faces the magnetic recording medium and to the portion in the element portion which faces the magnetic recording medium prior to the forming of the protective film with a predetermined thickness.

3. A method according to claim 1, wherein the protective film is a DLC film, and the forming of the protective film further includes forming a silicon film or a silicon oxide film to at least the part of the predetermined surface in the substrate which faces the magnetic recording medium and to the portion in the element portion which faces the magnetic recording medium prior to the forming of the protective film with a predetermined thickness.

* * * * *